United States Patent [19]

Sjöholm

[11] 4,383,163
[45] May 10, 1983

[54] METHOD OF MANUFACTURING A HEAT EXCHANGE TUBE WITH INTERNAL SURFACE ENLARGING ELEMENTS

[75] Inventor: Bertil H. Sjöholm, Ronneby, Sweden

[73] Assignee: Gotaverken Anteknik AB, Gothenburg, Sweden

[21] Appl. No.: 205,299

[22] Filed: Nov. 10, 1980

Related U.S. Application Data

[62] Division of Ser. No. 948,482, Oct. 4, 1978, Pat. No. 4,241,287.

[30] Foreign Application Priority Data

Oct. 27, 1977 [SE] Sweden .............................. 7712118

[51] Int. Cl.³ ............................................. B23K 11/32
[52] U.S. Cl. ..................................... 219/107; 219/99
[58] Field of Search ................. 219/161, 98, 158, 99, 219/107, 64; 165/109 T, 179; 138/38

[56] References Cited

U.S. PATENT DOCUMENTS

| | | |
|---|---|---|
| 1,101,858 | 6/1914 | Laehman . |
| 1,630,338 | 5/1927 | Gail .............................. 219/107 X |
| 1,929,444 | 10/1933 | Murray . |
| 2,364,130 | 12/1944 | Clancy .......................... 165/179 X |
| 2,365,670 | 12/1944 | Wallace ......................... 165/179 X |
| 2,473,633 | 6/1949 | Brown . |

Primary Examiner—Elliot A. Goldberg
Attorney, Agent, or Firm—Schuyler, Banner, Birch, McKie and Beckett

[57] ABSTRACT

The invention relates to a tube with surface-enlarging elements attached to the inside thereof, which elements are in the form of radially inwardly directed pins welded on the tube wall. A method for forming such a tube also is provided, the method comprising inserting a holder for each pin into the tube and moving the holder outwardly to press the pin against the tube wall while welding the pin thereto.

4 Claims, 6 Drawing Figures

METHOD OF MANUFACTURING A HEAT EXCHANGE TUBE WITH INTERNAL SURFACE ENLARGING ELEMENTS

This application is a division of application Ser. No. 948,482, filed Oct. 4, 1978, now U.S. Pat. No. 4,241,287.

This invention relates to a tube with surface-enlarging elements attached to the inside thereof. The invention also relates to a method and an apparatus for manufacturing such tube.

It is generally known to use surface-enlarging elements on the inside of tubes and pipes in order thereby to improve the heat transfer from a substance flowing in the tube or pipe to the outside of the pipe or tube. Such surface-enlarging elements are flanges and fins extending through the pipe or tube. These elements are either attached or formed simultaneously with the manufacture of the pipe or tube. In the case of very large tube diameters the elements can be secured by welding later on. At times the elements are positioned detached with a certain prestressing pressure or force fit against the inside of the pipe or tube.

The object has always been to increase the heat transfer, i.e. to render the surface-enlarging elements more efficient. This object has been realized in the present invention by a tube and a method and apparatus for forming it, wherein the tube is provided with pins welded on the inside thereof, thereby bringing about a turbulent flow about the elements and providing the possibility to adjust the number of pins per tube length, the thickness of the pins and their location relative to each other being dependant on the heat data concerned.

Such a tube and the method and apparatus by which it is formed defined in the clauses of the attached parallel appended claims.

The invention is described in greater detail in the following by way of example, with reference to the accompanying drawings, in which FIG. 1 shows schematically an apparatus for manufacturing a tube according to the invention;

Figure 1:
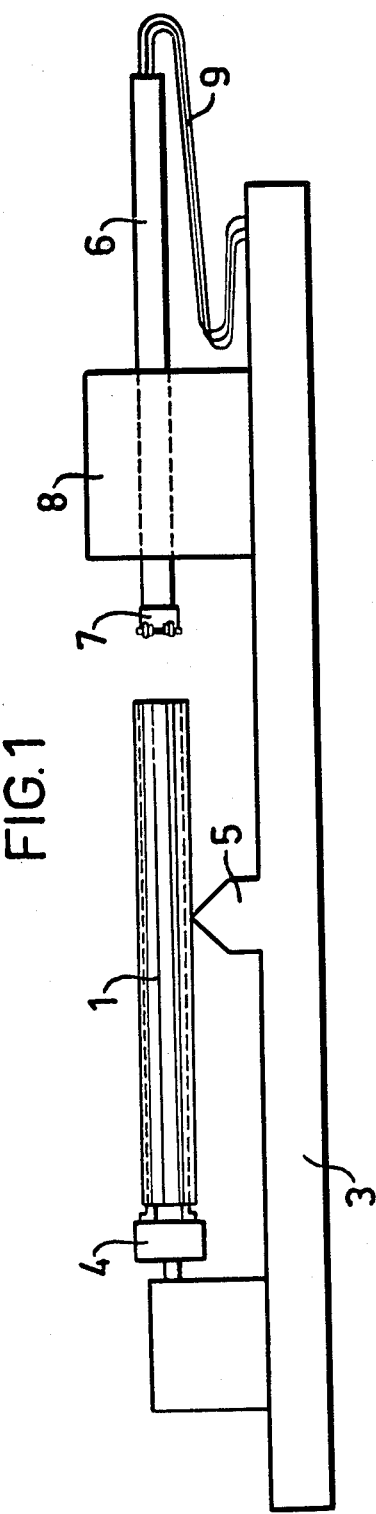

In FIG. 1 the tube to be provided with pins is designated by 1. A foundation 3 is provided with a rotary chuck 4, which clamps one end of the tube 1. The foundation 3 further is provided with a support 5, which supports the tube 1 along its length in horizontal position. A device 6 provided with a head 7 and movable at the foundation 3 is provided coaxially with the tube 1. In this Figure, the device 6 is shown mounted movably in a stand 8 located on the foundation. The numeral 9 designates the electric cables for pressure welding, which are indicated schematically and will be described later.

Figure 2:
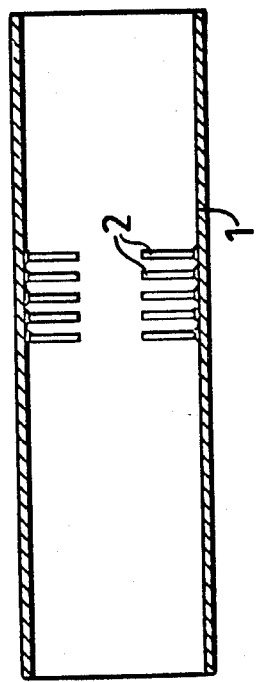
FIG. 2 is a partial longitudinal section along a tube with a number of pins welded therein.

FIG. 2 shows the tube 1 with a number of pins 2 welded therein.

Figure 3:
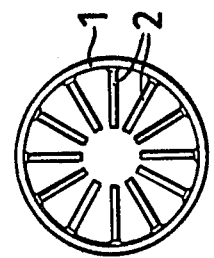
FIG. 3 is an end view of the tube according to FIG. 2.

FIG. 3 shows how these pins 2 are arranged like spokes in a wheel, seen in the longitudinal direction of the tube.

Figure 4:
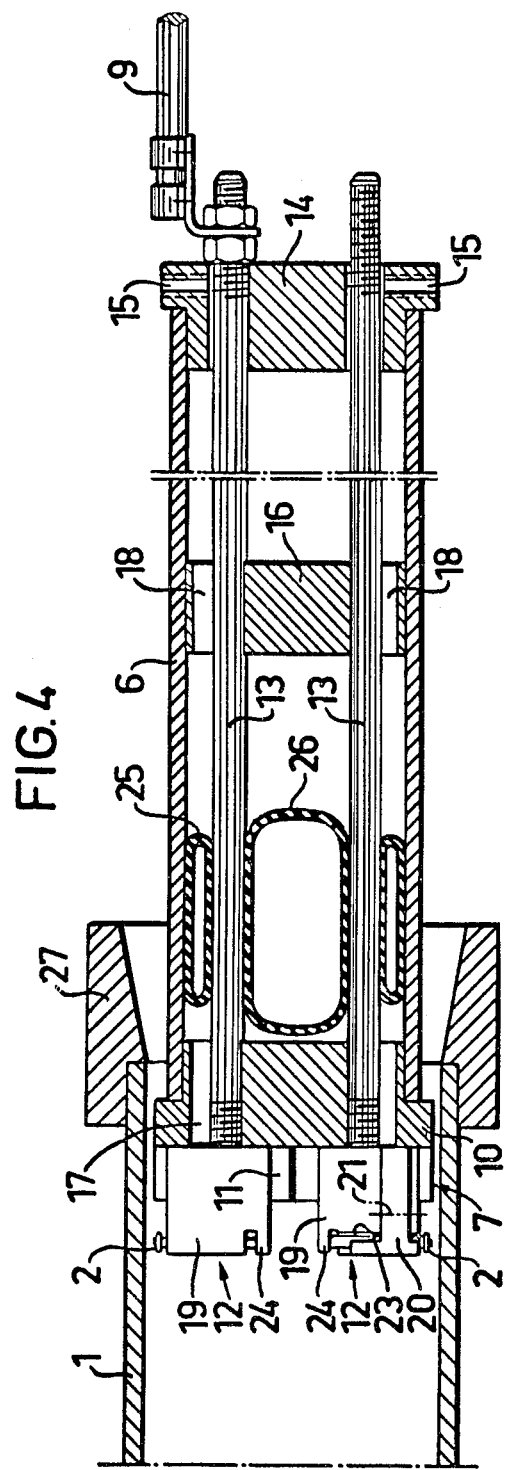
FIG. 4 shows in greater detail the device for securing the pins by welding.
Figure 5:
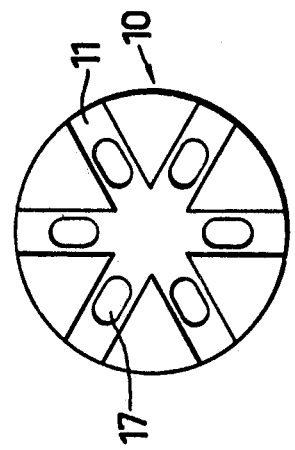
FIG. 5 is a detail view of a portion of the apparatus.

The device proper for welding the pins 2 on the inside of the tube 1 is shown in greater detail in FIG. 4. The head 7 carried by the device 6 consists of a substantially cylindrical guide body 10, which is provided with six radially extending slots 11 (see also FIG. 5). In said slots 11 holders 12 are arranged capable to move in a radial direction outward and inward. The holders, which are substantially prism shaped, are prevented from moving in the circumferential direction of the tube due to their thickness corresponding to the width of the slots 11. The holders 12 are retained in the slots 11 by means of rods 13, which are secured at the opposed end of the head 7 of the device 6. This is accomplished by means of a cylindrical end bushing 14, which is attached to the device 6 and provided with bores for the rods 13. The rods are locked at the bushing 14 by means of locking screws (not shown), which are attached in the threaded holes 15. The rods 13 supporting the holders 12 further are supported substantially at the center by a supporting body 16 provided in the device 6. The rods 13 constitute conductors between the respective holder 12 and the electric cable 9.

The guide body 10 as well as the supporting body 16 are provided with through holes 17 and, respectively, 18 for the rods 13. For rendering it possible for the holders 12, and therewith for the rods 13, to move in a radial direction, said holes 17, 18 have an oblong or slot-like configuration. The holes 17 also form stops limiting the inward movement of the holders 12. It is understood that the movement of the holders 12 is permitted by the elasticity of the rods 13.

The holders 12, which in the embodiment shown are six in number, each comprise substantially two portions, one first portion 19 and one second portion 20. These portions together form a clamping means, which in principle acts like a clothes-peg, at which the second portion 20 is pivotally mounted in the first portion 19 at 21. A spring 22 tends to move apart the ends of the portions 19 and 20, which ends co-operate with said spring, (see FIG. 6). The holder end opposed to the spring 22 is formed with a cylindrical slot 23, which is open to the edge of the holder, and at the lateral edge of the holder facing toward the center is in alignment with a projection 24.

The diameter of the slot 23 corresponds to the diameter of the pin 2 to be welded on the tube. As it appears in FIG. 4, the pin 2 is cylindrical and provided with a flange and a small coaxial peg at that end, which is to be welded on the tube. Such design is per se known in pressure welding.

An air-filled cushion in the form of an inflated rubber hose 25 is provided about the rods 13 and abuts the same and the inside of the device 6. Said cushion, by its tendency of expanding always will press the rods 13 against the center of the device and thereby maintain the holders 12 in a bottom position against the center of the head 7. In this position, the holders 12 and the pins 2 inserted therein are out of contact with the inside of the tube when the device 6 is being inserted into the tube 1 (FIG. 4).

An inflatable air-cushion 26 is provided in the space formed between the rods 13. Upon its inflation force exerted by the air-cushion 26 will exceed the force from the rubber hose 25 and press the rods radially outward. The holders 12 thereby also will be moved outward and press the pins with their pegs with a certain pressure, which is adjusted to the subsequent welding, against the inside of the tube 1.

In order to facilitate the understanding of the invention, it is described in the following also in connection with a method of welding a plurality of pins within a tube.

At the position of the apparatus according to FIG. 1, the head 7 is charged with pins 2, i.e. pins 2 are inserted into the slots 23 of the six holders 12. This inserting operation takes place automatically in some way known in the art and does not constitute a subject matter of the present invention.

When the head is charged with six pins 2, the device 6 is moved by suitable drive means (not shown) with the head 7 carrying the pins into the tube 1, which is already clamped in the chuck 4. The device automatically stops its movement when the pins 2 have assumed the predetermined position in the tube 1. The air cushion 26 is inflated to a pressure adjusted to the welding and thereby presses the pins 2 with their pegs against the inside of the tube 1. The welding apparatus, which operates according to the capacitor-discharge method known per se, is activated, and the pins 2 are welded on the tube wall in a manner characteristic of the method. The rubber-cushion 26, due to its small mass, is sufficiently "quick" to be able at the moment of welding, some hundredths of a second, to maintain the metallic contact between the pins and the tube during the entire procedure.

Figure 6:
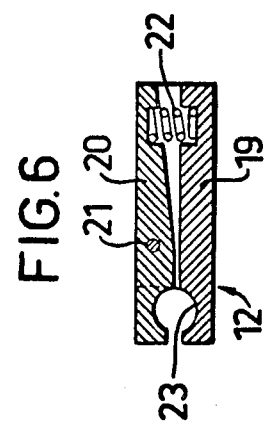
FIG. 6 is a sectional detail of another portion of the apparatus.

When the six pins 2 have been welded in position in the tube 1, the air-cushion 26 is emptied, and the device 6 is pulled out of the tube. This is possible, because the pins 2 now fixed are released from the slot 23 of the respective holder 12 via the axial slot opening, in that the portion 20 is rotated clockwise against the action of the spring 22 (FIG. 6). At the same time as the pins are released from the holders 12, the holders momentarily are moved inward against the center of the head 7 by action of the hose 25.

The head 7 pulled out of the tube 1 again is charged with six pins 2 and thereafter is turned through 30° before it is inserted into the tube 1. The head 7 is advanced in the tube such a distance that the pins 2 are located in the same plane as the previously welded pins. This is possible because the head had been turned through said 30°.

The new pins thereafter are welded on according to foregoing procedures and the device is pulled out of the tube. A ring of twelve pins 2 according to FIG. 3 has now been attached in the tube 1 by welding. These pins lie in a plane which is perpendicular to the longitudinal axis of the tube.

The procedure is repeated, but now the head is not inserted into the tube to a lesser depth. This depth is determined by the calculated longitudinal distance between the pins (See FIG. 2).

The pins of the new ring may be aligned with the pins of a preceding ring, or the pins in the new ring may be angularly offset more or less in relation to preceding pins. In this latter case the pins 2 can be arranged to form a helical passage in the completed tube.

Instead of turning the head 7, the tube 1 may be turned between the welding procedures.

In order to facilitate at the automatic operation the insertion of the device 6 with the head 7 into the tube 1, the tube as shown in FIG. 4 may be provided with a guide cone 27. The cone preferably can be attached to the tube by means of locking screws or the like, and its purpose is to compensate for any misalignment by guiding the head into the tube when the welding operation commences.

What I claim is:

1. A method of manufacturing a heat conducting member in the form of a tube provided with surface enlarging pin elements at its internal wall face, comprising the steps of:
   mounting said tube on a support;
   arranging a plurality of elongate pin holders in an annular group, each of said holders having a length sufficient to position a pin at any desired location along said tube;
   placing a pin in each of said holders generally transverse to the length of said holders;
   inserting said holders into said tube to a desired depth and position where said pins are to be attached;
   applying an outwardly directed force to said holders to bring one end of each of said pins into contact with said internal wall face;
   passing a welding current through said pins and the areas of contact at said wall face, while continuing to press said pins against said wall face;
   detaching said holders from said pins and removing said holders from said tube; and
   repeating the above pin positioning and welding steps for each group of pins to be attached to said internal wall face.

2. The method according to claim 1 wherein the step of applying an outwardly directed force to said holders comprises inflating an inflatable cushion located within said annular group of holders, adjacent to their pin-carrying ends, when the holders have been introduced to the desired depth into said tube.

3. The method according to claim 1 comprising the step of resiliently urging the pin-carrying ends of said holders away from said internal wall face after said holders are detached from said pins.

4. The method according to claim 1 wherein an annular inflatable sleeve member surrounds said annular group of holders, an inflatable cushion is located within said annular group of holders, the steps of introducing and removing said holders from said tube include deflating said cushion and inflating said sleeve, and the step of applying an outwardly directed force to said holders includes inflating said cushion and deflating said sleeve.

* * * * *